Figure 1:
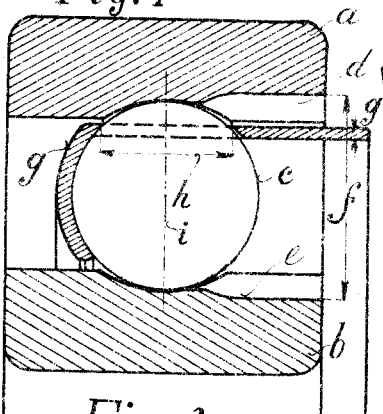

J. MODLER.
BALL BEARING.
APPLICATION FILED SEPT. 18, 1911.

1,078,940.

Patented Nov. 18, 1913.

4 SHEETS—SHEET 1.

WITNESSES
George Schlatt
J. O. Lungon

Johann Modler
INVENTOR

BY HIS ATTORNEYS
Kenyon & Kenyon

J. MODLER.
BALL BEARING.
APPLICATION FILED SEPT. 18, 1911.

1,078,940.

Patented Nov. 18, 1913.

4 SHEETS—SHEET 2.

WITNESSES

Johann Modler
INVENTOR,

BY HIS ATTORNEYS,

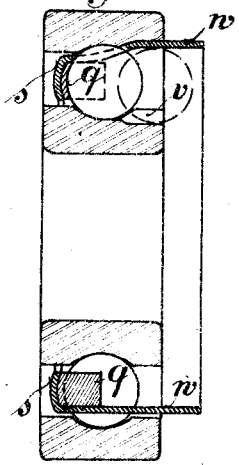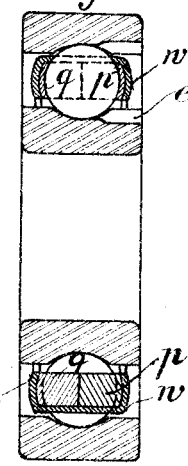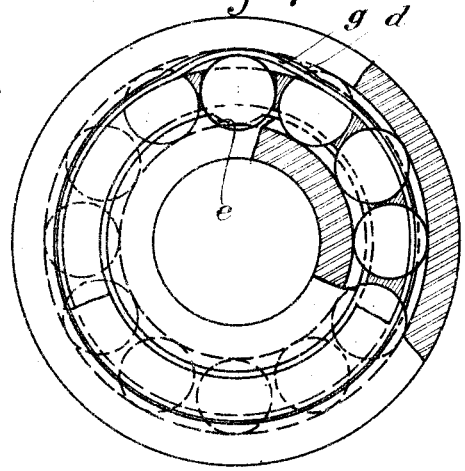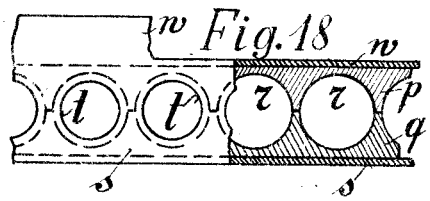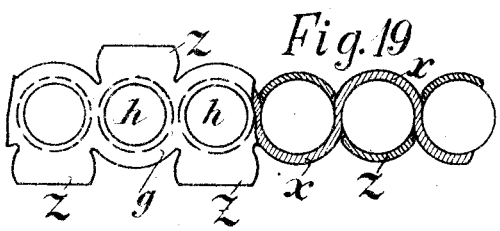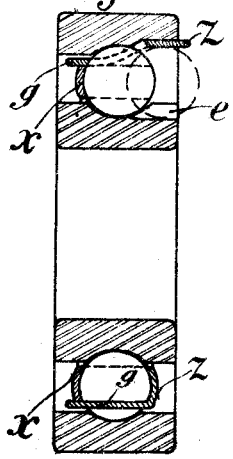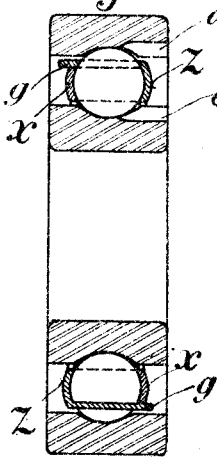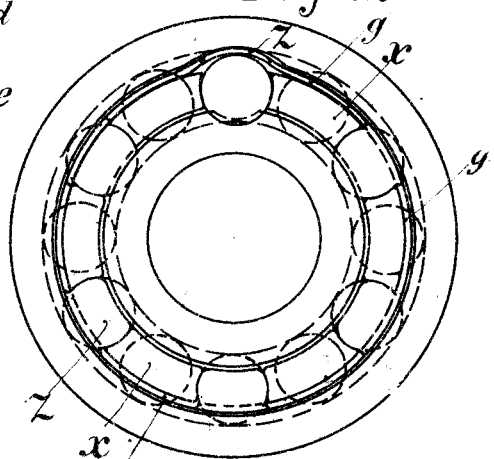

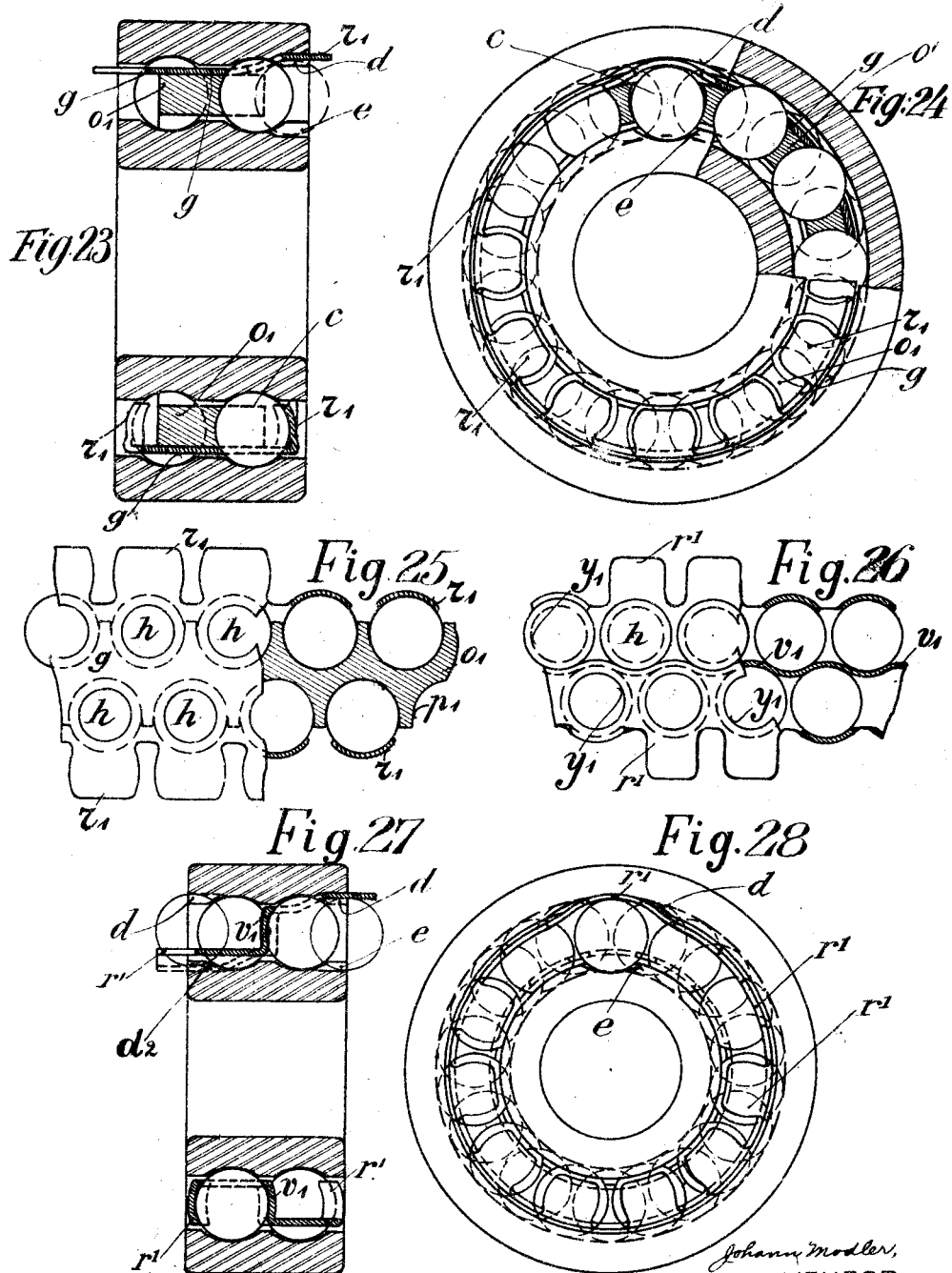

UNITED STATES PATENT OFFICE.

JOHANN MODLER, OF SCHWEINFURT, GERMANY.

BALL-BEARING.

1,078,940. Specification of Letters Patent. Patented Nov. 18, 1913.

Application filed September 18, 1911. Serial No. 649,780.

*To all whom it may concern:*

Be it known that I, JOHANN MODLER, of Schweinfurt-on-the-Main, Germany, have invented certain new and useful Improvements in Ball-Bearings, of which the following is a specification.

My invention relates to ball bearings.

It is particularly adapted to that form of ball bearing in which a cage is used to space the balls, so that in rotating they will not come in contact with each other, and my invention relates more particularly to this means for spacing the balls. I have found that by constructing a ball bearing in which it is unnecessary to use bolts, rivets, screws or other means for holding the parts of the cage together, the separating cages have heretofore been made in several parts, that I am enabled to construct a bearing which permits me to have the maximum number of balls possible without having the balls touch one another in their rotation.

By constructing a ball bearing with my improved cage, or separating means, I am enabled to make a ball bearing having the greatest load carrying capacity possible without having the disadvantage of the balls touching each other in their rotation.

My invention also has the advantage of great economy in manufacturing, in that it does away with the use of screws, bolts, rivets, &c., and the time required to assemble a bearing when such means are used as just enumerated.

The important feature of my invention is the construction of a bearing having a cage made of a single piece of material, which cage may in itself perform all of the functions of separating the balls, or may hold in place additional means for separating the balls without the use of bolts, nuts, rivets, etc.

In the drawings I have shown in Figures 1, 2, 3, 4, 5 and 6 the simplest form of my invention and the way in which the balls are introduced, when my invention is in use. In the other figures, from Fig. 7 to Fig. 28 inclusive, I have shown modifications of my invention, which I will describe in detail later.

Figure 2:
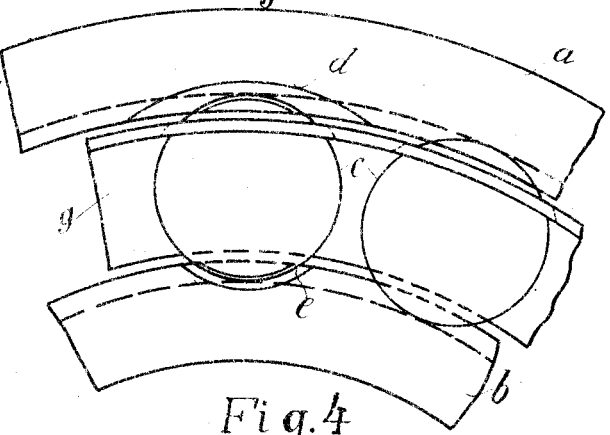
Figure 3:
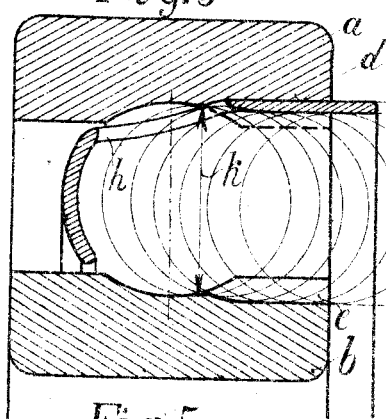
Figure 4:
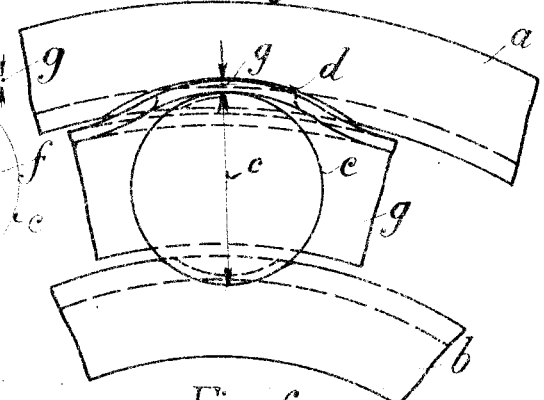
Figure 5:
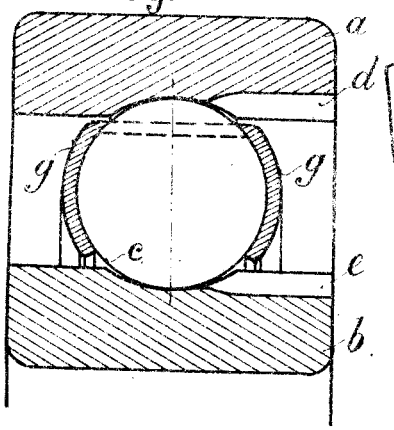
Figure 6:
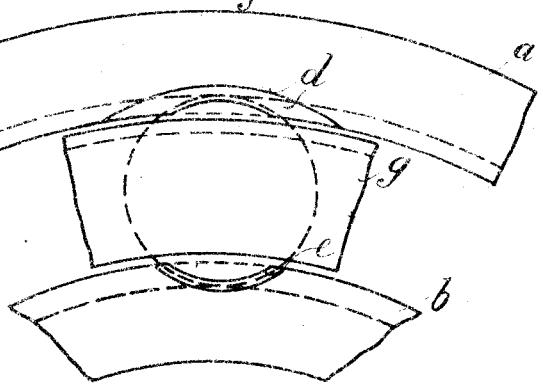
Figure 7:
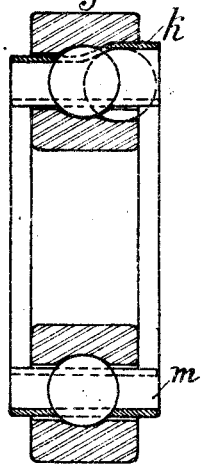

In Figs. 1 to 6, $a$ is the outer ring of the bearing and $b$ the inner ring, each of the rings $a$ and $b$ having on their adjoining faces ball races as shown. In order to permit the ball $c$ to be inserted into the races, I provide the grooves $d$ and $e$ in the adjoining rims of the ball races, the groove $d$ on the outer ring $a$ and the groove $e$ on the inner ring $b$. These grooves when brought into register, as shown in Figs. 1 to 6, enable the ball $c$ to be inserted into the ball races. My improved cage, as shown in Figs. 1 to 6 consists of the metal cage $g$ formed in the shape of an L as shown in Figs. 1 and 2, and having the openings $h$ through which the ball $c$ partially projects. These openings are of less diameter than the diameter of the balls. The openings $h$ are preferably beveled on the side of the cage facing the balls. In the construction of this bearing, I make the opening caused by bringing the grooves $d$ and $e$ of the outer and inner ring into register, which I have denoted as $f$ in Figs. 1 and 2, so that it is equal to the diameter of the ball $c$, plus the thickness of the cage $g$. As shown in Figs. 3 and 4, that part of the cage $g$, which is in the space between the grooves $d$ and $e$ is bent back so as to permit the ball $c$ to be placed into the races. In Fig. 3 I have shown the position of the ball in several different positions while it is being inserted into the races. The space which I have denoted $k$ in Fig. 3, which is the point at which the entrance grooves enter the raceways, I make the same as the diameter of the ball, or preferably a trifle less, and force the ball through the space. When the balls $c$ are all in place in the races, that part of the cage $g$ which has been on the side of the ball with the grooves through which the balls have been inserted, as shown in the right of the Figs. 1 and 3, is bent over so as to engage with the outer surface of the balls $c$, as shown in Fig. 5. The openings $h$ in the cage $g$ are so arranged as to space the balls $c$ sufficiently far apart, so that they will not touch one another in rotation, but preferably so that the maximum number of balls may be placed into the bearing. In Fig. 2 I have shown one ball and a portion of two others as they are spaced in the preferred form of my bearing.

Figure 8:
Figure 9:
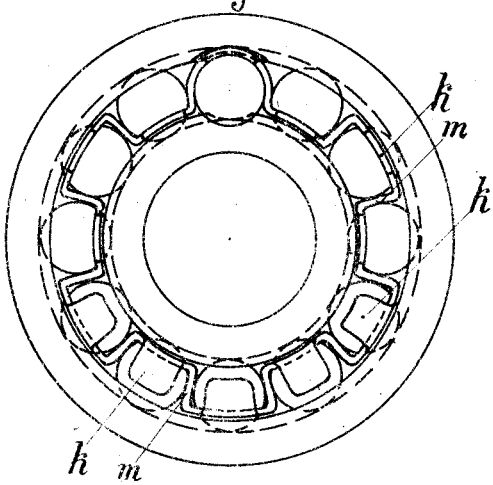
Figure 10:
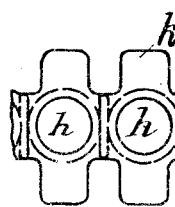
Figure 11:
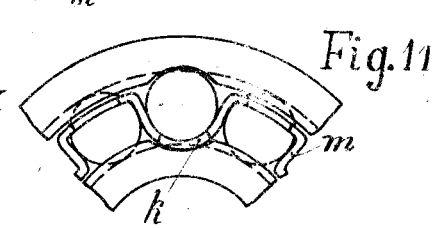

In Figs. 7, 8, 9, 10 and 11, I show another form of my invention in which the cage is bent so that the openings $h$ in the cage are on the opposite sides of the adjacent balls, and that part of the cage between the openings $h$ passes between the balls and forms a separating wall, $m$. In this form the cage is provided with the flaps $k$, as shown in Fig. 10, which are bent around the opposite sides of the ball, as shown in Fig. 8. The method of inserting the balls is the same in this form as in Figs. 1 to 6, and is shown in detail in Fig. 7.

Figure 12:
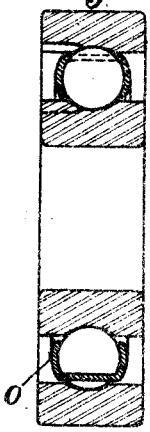
Figure 13:
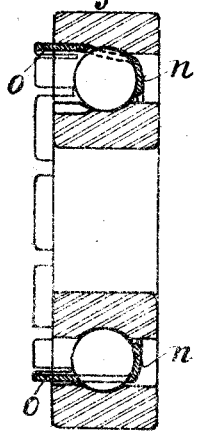
Figure 14:
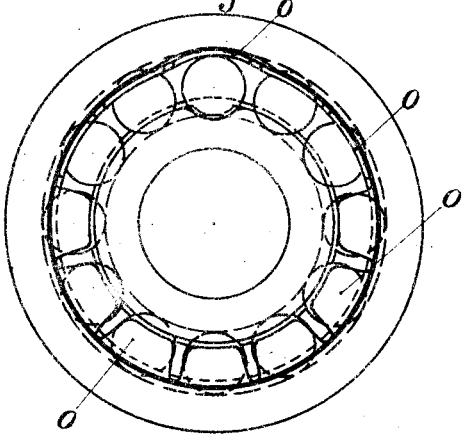

In Figs. 12, 13 and 14 I have shown a bearing having the same form and construction of cage as shown in Figs. 1 to 6 except that I have cut out a portion of the cage $g$, so as to provide each of the balls with a separate flap $o$, adapted to be bent around the balls to embrace them as shown.

In Figs. 15, 16, 17 and 18, I show a bearing having the same form as that in the preceding Figs. 1 to 6, and 12 to 14, and as it is sometimes desirable to have the balls almost completely surrounded to keep out dirt, &c., I have provided supplementary cages of solid pieces of material with hemispherical cavities. In Fig. 18 I show the two members $p$ and $q$ having the hemispherical openings which form the opening $r$ for the ball. In assembling the bearing constructed in this form, I bend part of the cage, as shown by the letter $s$ in Fig. 15; place therein the member $q$, and after inserting each of the balls, as shown in Fig. 15, I place over the balls the member $p$, and fold over it that member of the cage which I have marked $n$.

Heretofore in the construction of bearings in which two members were used to form a cage for the balls they were held together by bolts, screws, &c., but by use of my improved cage the use of any screws, clamps, bolts, &c., is dispensed with, the advantage of this being that the openings $r$—$r$ for the balls may be placed very close together, as there is no necessity for anything passing through the material between the openings, in order to hold the cage together.

The modification shown in Figs. 19, 20 and 21 consists of the cage $g$, having flaps $z$ $z$ arranged alternately so as to engage the opposite sides of adjacent balls. This cage is also provided with the openings $h$ for the balls. In addition I provide a supplemental cage $x$ adapted to engage with the opposite side of adjacent balls, so that the supplemental cage $x$ will engage on the opposite side of the same ball which the flap $z$ of the cage $g$ engages. In assembling this bearing, I place the cage $g$ having openings $h$ and flaps $z$ in position and insert every other ball, after which I place the supplemental cage $x$ in position, insert the additional balls, and then bend over the flaps $z$ of the cage $g$. In this way the supplemental cage $x$ is held in position, and the balls are separated as desired.

In Figs. 23 to 25 inclusive, I have shown my invention as applied to a double row bearing, in which the inner and outer rings contain two ball races. In this form I provide the ordinary grooves $d$ and $e$ for each of the races, but they are preferably arranged so that when the grooves $d$ and $e$ for one row of balls are in register, the grooves for the other row will be out of register and form my cage as shown in Fig. 25, with the flaps $r'$ for inclosing the balls. In this form I also provide the member $o'$ having openings $p'$, as shown in Fig. 25, arranged as shown, which member $o'$ forms a supplemental separating cage. In this form I also provide the openings $h$ in the cage $g$ for the balls $c$. This bearing is assembled by bringing the grooves $d$ and $e$ into register and placing the balls into position in one row, folding over the flap $r'$, placing into position the supplemental cage $o'$ and then bringing the grooves for the other row into register, and placing the balls into position and bending over the other flap $r'$ on the other side.

In Figs. 26 to 28 inclusive I have shown another form of my invention as applied to a double row bearing, in which I omit the auxiliary cage $o'$ and use only the cage $g$, having the flaps $r'$ and the openings $h$. In this form, however, I bend the cage $g$ so as to form a wall $v'$ between the two rows of bearings. In this form the openings $h$ for the balls $c$ will be on the outer side of the balls in one row and on the inner side of the balls in the other row. In this form of invention the bearing is assembled as shown in Fig. 27, the cage being put into position, the balls are inserted until the balls in one row have all been placed, when the flap $r'$ is bent around so as to inclose these balls, and then the balls in the other race are inserted until they are all in place; when the flaps $r'$ for this side of the bearing are turned over the balls so as to inclose them.

While I have shown and described several modifications of my invention, anyone skilled in the art could make other modifications without departing from the spirit of my invention.

I claim:

In a ball-bearing, the combination of an inner and outer ring having ball races in their adjoining surfaces, a one-piece separator inclosing the balls on both side faces, grooves in the slots of such raceways adapted to be brought into register to permit the insertion of the balls into the raceways, the space between the bottom of said grooves when brought into register being equal, for a portion of the distance toward the ball races, to the diameter of the ball plus the thickness of the cage, said grooves entering the raceways at a point above the bottom of the raceway, substantially as set forth.

In testimony whereof, I have signed my name to this specification, in the presence of two subscribing witnesses.

JOHANN MODLER.

Witnesses:
I. HINZE,
CURT HAGNER.